(12) United States Patent
Ahmed et al.

(10) Patent No.: US 7,945,560 B2
(45) Date of Patent: May 17, 2011

(54) TECHNIQUE FOR REMOVING SUBQUERY IN GROUP BY—HAVING CLAUSES USING WINDOW FUNCTIONS

(75) Inventors: Rafi Ahmed, Fremont, CA (US); Srikanth Bellamkonda, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 489 days.

(21) Appl. No.: 12/125,783

(22) Filed: May 22, 2008

(65) Prior Publication Data

US 2009/0292669 A1 Nov. 26, 2009

(51) Int. Cl.
*G06F 7/00* (2006.01)
*G06F 17/30* (2006.01)

(52) U.S. Cl. .................................................. 707/714
(58) Field of Classification Search ................... None
See application file for complete search history.

*Primary Examiner* — Pierre M Vital
*Assistant Examiner* — Jason Liao
(74) *Attorney, Agent, or Firm* — Hickman Palermo Truong & Becker LLP

(57) ABSTRACT

Methods for transforming a query to remove redundant subqueries in HAVING clauses are provided. The methods provided transform queries that contain subqueries in HAVING clauses with tables and join conditions and filter conditions equal to tables, join conditions and filter conditions in outer query to queries that eliminate the original subquery and retain the original outer query with a single inline view using window functions. Whether this transformation can be performed depends on which tables and join and filter conditions are in the outer query and the subquery. The transformation eliminates duplicative table accesses and join operations from queries.

22 Claims, 5 Drawing Sheets

| ps_partkey | value |
|---|---|
| 101 | $20,000 |
| 102 | $20,000 |

TECHNIQUE FOR REMOVING SUBQUERY IN GROUP BY—HAVING CLAUSES USING WINDOW FUNCTIONS

FIELD OF THE INVENTION

The present invention relates to database systems and, in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query submitted to a database server is analyzed by a query optimizer. Based on the analysis, the query optimizer generates an execution plan optimized for efficient execution. The optimized execution plan may be based on a rewrite of the query.

In one type of inefficient queries, a complex query contains a subquery in a HAVING clause where the subquery can be subsumed by an outer query. When a subquery in the HAVING clause of a complex query can be subsumed by the outer query of the complex query, but it is not removed by some technique, the result is a sub-optimal query execution plan that performs unnecessary and duplicative table accesses and join operations.

This type of inefficient queries occurs for many reasons. The first reason is that database users or application developers often do not write queries directly, but utilize database tools. Such database tools automatically generate queries based on the declarative input received from the user. In addition, even a human application developer may introduce these kinds of subqueries because he is not aware of the entirety of the intricacies of query transformation and optimization.

Therefore, it is desirable to develop techniques for rewriting queries to eliminate subqueries from HAVING clauses, where such subqueries can be subsumed by the outer query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Elimination of Subqueries in Having Clauses

Consider the following three tables, partsupp, supplier, and nation:

```
CREATE TABLE partsupp
(
    ps_partkey      NUMBER,
    ps_suppkey      NUMBER,
    ps_supplycost   NUMBER,
    ps_availqty     NUMBER
)
CREATE TABLE    supplier
(
    s_suppkey       NUMBER,
    s_nationkey     NUMBER
)
CREATE TABLE    nation
(
    n_nationkey     NUMBER,
    n_name          VARCHAR
)
```

Table partsupp contains four columns: ps_partkey, ps_suppkey, ps_supplycost, and ps_availqty. Table supplier contains two columns: s_suppkey and s_nationkey. Table nation also contains two columns: n_nationkey and n_name.

Figure 1:
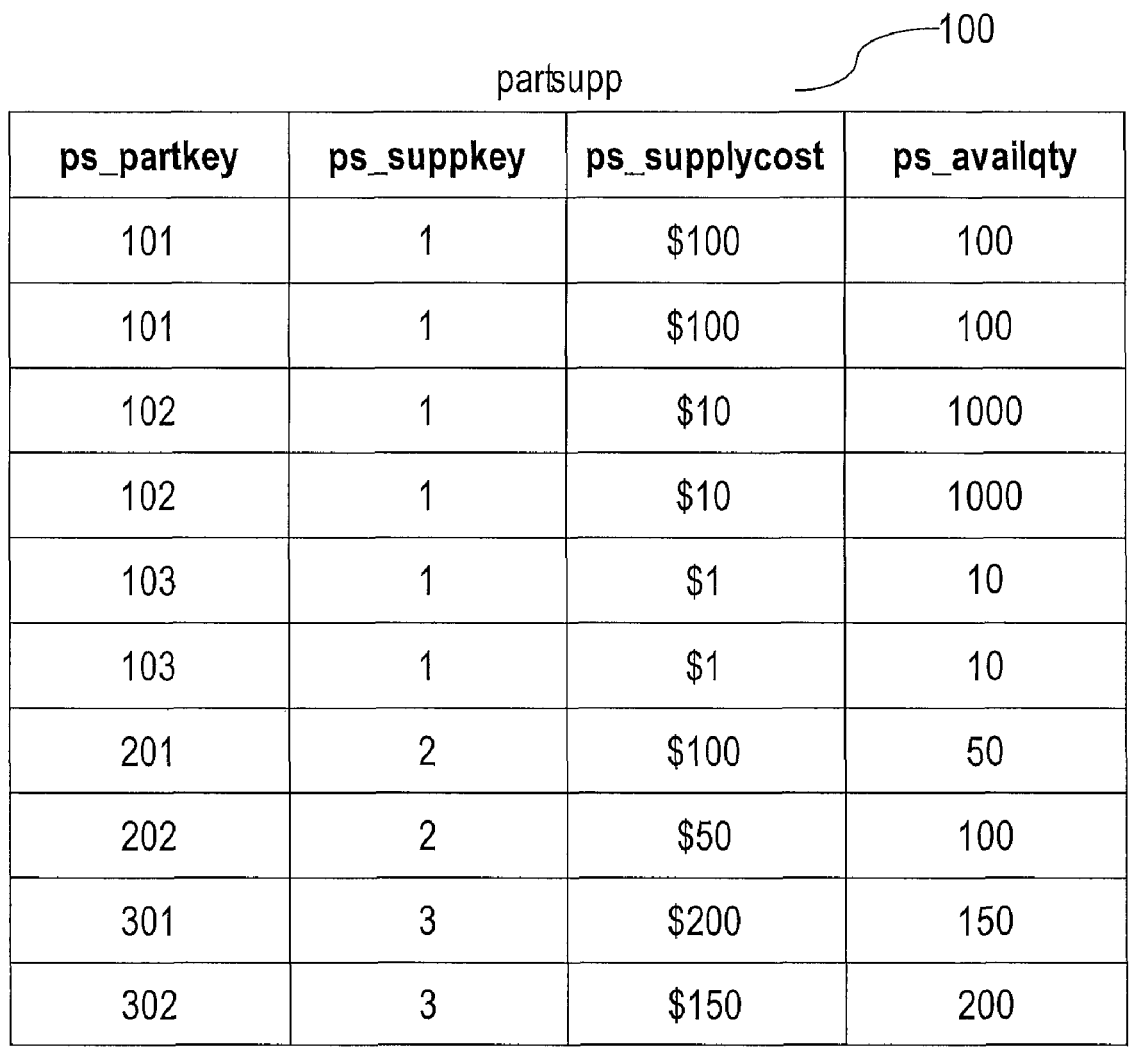
FIG. 1 depicts an example of a table containing parts and supplier information.
Figure 2:
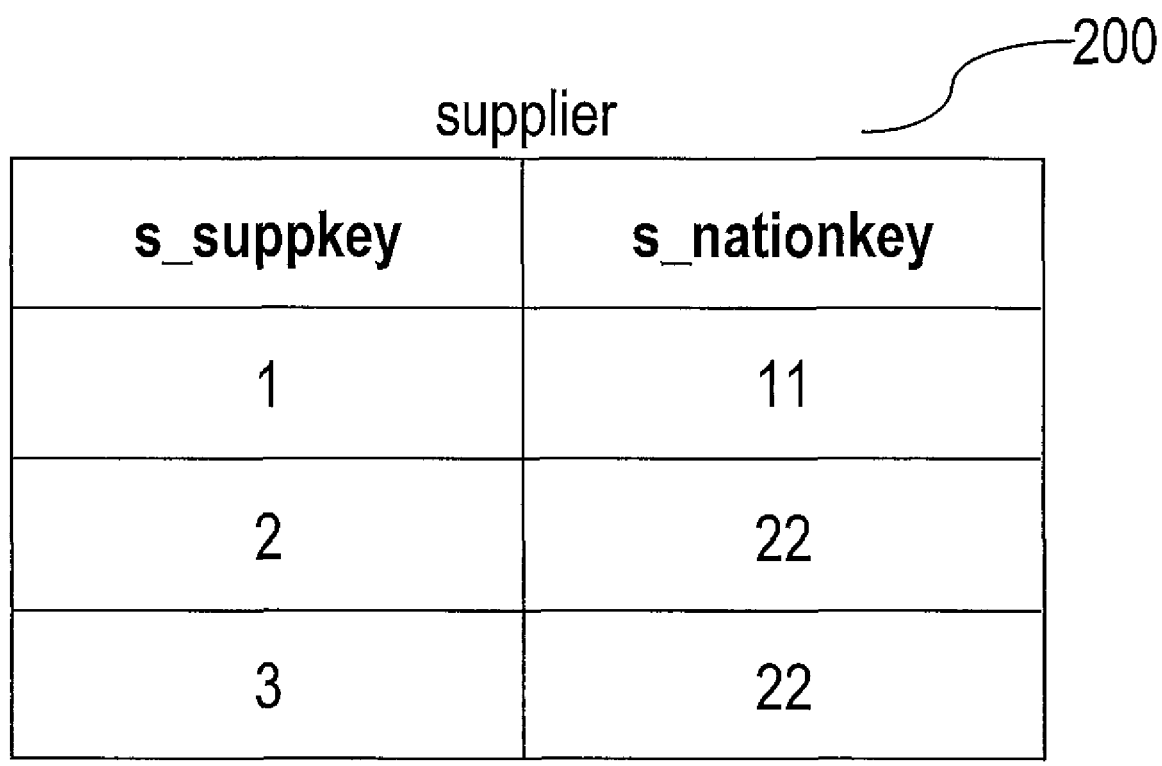
FIG. 2 depicts an example of a table containing supplier information.
Figure 3:
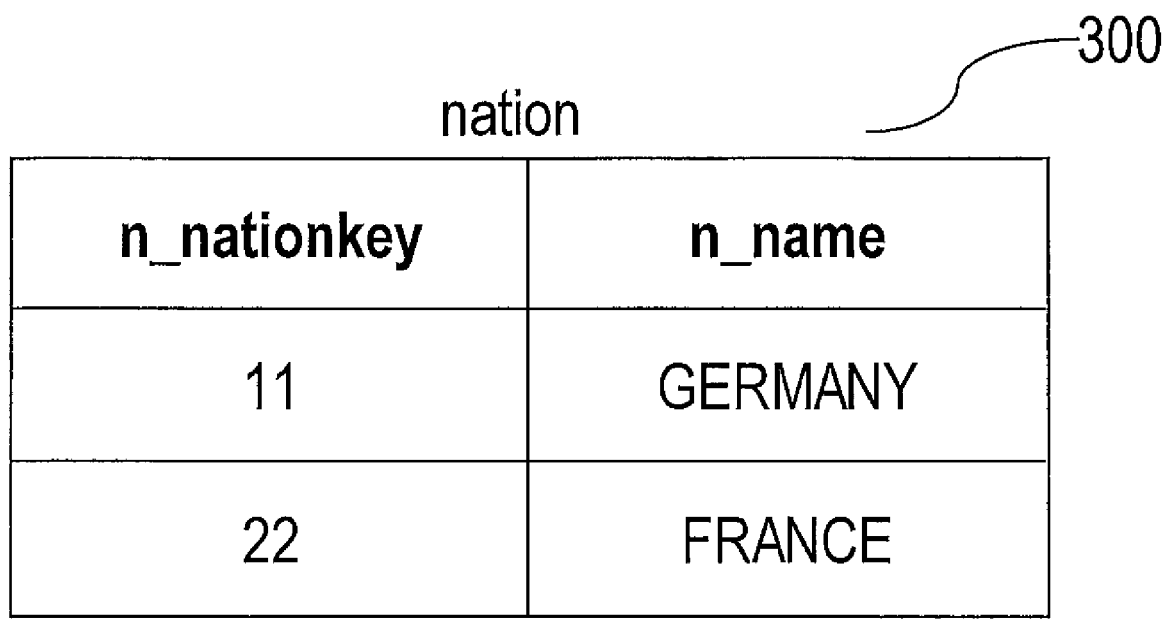
FIG. 3 depicts an example of a table containing information about nationalities of suppliers.

FIG. 1 illustrates a Table 100 which contains sample values consistent with the table definition for the partsupp table described above. FIG. 2 illustrates a Table 200 which contains sample values consistent with the table definition for the supplier table described above. FIG. 3 illustrates a Table 300 which contains sample values consistent with the table definition for the nation table described above.

Query Q1 below illustrates an example of a query which contains an outer query and a subquery within a HAVING clause:

```
Q1 = SELECT ps_partkey, SUM(ps_supplycost * ps_availqty)
        as value
    FROM partsupp, supplier, nation
    WHERE ps_suppkey = s_suppkey
        and s_nationkey = n_nationkey
        and n_name = 'GERMANY'
    GROUP BY ps_partkey
    HAVING SUM(ps_supplycost * ps_availqty) >
        (SELECT SUM(ps_supplycost * ps_availqty) * 0.001
            FROM partsupp, supplier, nation
            WHERE ps_suppkey = s_suppkey
                and s_nationkey = n_nationkey
                and n_name = 'GERMANY');
```

The results of Query Q1 lists two columns: ps_partkey and value. The value column contains the sum of ps_supplycost*ps_availqty, grouped by ps_partkey. Only the rows which satisfy the three join conditions in the outer query will be used to compute the query results. And finally, the HAVING clause contains a condition that the sum of ps_supplycost*ps_availqty on a per-ps_partkey basis be greater than one-thousandth of the results from the subquery in the HAVING clause. This subquery contains the same join conditions as the outer query.

Figure 4:
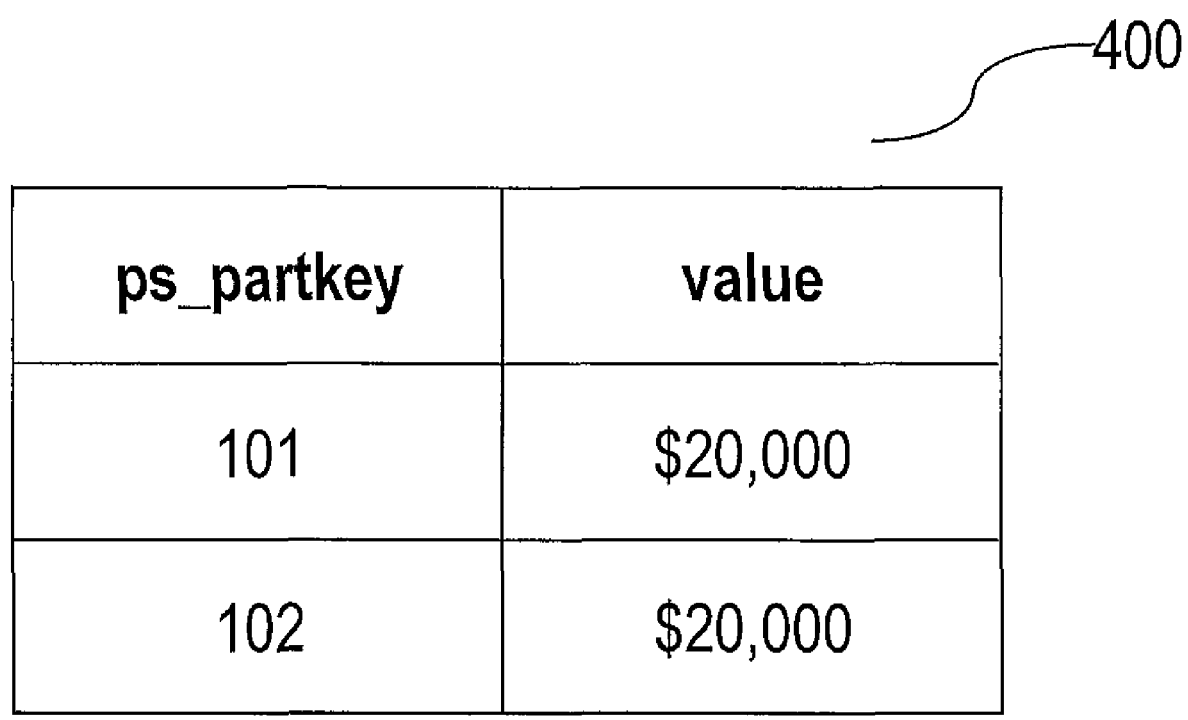
FIG. 4 depicts query results for a sample query containing a subquery in a HAVING clause.

FIG. 4 illustrates query results 400 for query Q1, based on the sample values in tables 100, 200, and 300. Results 400 are derived as follows. The three join conditions in the outer query specify that the results only contain rows in table partsupp (Table 100) whose ps_suppkey is equivalent to a s_suppkey in table supplier (Table 200) which is in turn equivalent to an n_suppkey in table nation (Table 300) for rows whose n_name is "GERMANY". In table nation (Table 300), there is only one row that contains "GERMANY" in the n_name column and that row contains 11 in the n_nationkey column. Turning next to table supplier (Table 200), there is only one row in that table which contains 11 in the s_nationkey column, and that row contains 1 in the s_suppkey column. Now turning to table partsupp (Table 100), there are six rows which contain 1 in the ps_suppkey column, and these rows contain the values 101, 102, and 103 in the ps_partkey column.

The outer query in Query Q1 contains an algebraic aggregate function: SUM (ps_supplycost*ps_availqty). This algebraic aggregate function computes the sum of ps_supplycost*ps_availqty for each ps_partkey, as dictated by the GROUP BY clause. An algebraic aggregate function performs computations that are decomposable over the partitions of the table. The partition may encompass the entire table. Examples of algebraic aggregate functions include SUM, COUNT, AVG, MIN, and MAX.

In addition, the HAVING clause contains a filter that compares the sum of ps_supplycost*ps_availqty for each ps_partkey to a fraction of the results of a subquery. This subquery contains the same join conditions as the outer query, and returns the sum of ps_supplycost*ps_availqty, multiplied by 0.001, for the rows that satisfy the join conditions. The rows which satisfy the join conditions, as explained above, are the six rows in table partkey (Table 100) which contain 1 is the ps_suppkey column. The sum of ps_supplycost*ps_availqty for these rows is ($100*100)+($100*100)+($10*1000)+($10*1000)+($1*10)+($1*10)=$42,000. The result of the subquery in the HAVING clause is therefore $42,000*0.001, or $42.

As just discussed, the filter condition in the subquery compares the sum of ps_supplycost*ps_availqty for each ps_partkey, with $42. For both ps_partkey 101 and ps_partkey 102, this sum is $20,000. For the rows whose ps_partkey column is equal to 103, however, this sum is only $20. Therefore, the rows with ps_partkey equal to 103 are filtered out, and the final results for query Q1 is results 400, listed in FIG. 4.

Query Q1 as written above, however, is inefficient. First, the join operations in the outer query and the subquery, which are the same, are performed twice. Also, the algebraic aggregate function of SUM (ps_supplycost*ps_availqty) is computed twice over table partsupp. Both join operations and algebraic aggregate functions are expensive operations and should be minimized. In addition, Query Q1 also involves duplicative accesses to the table partsupp.

Query Q2, below, is a rewritten version of Query Q1 that removes the duplicate join operations and table accesses.

```
Q2 = SELECT ps_partkey, value
        FROM (SELECT ps_partkey,
                SUM(ps_supplycost * ps_availqty) as value,
                SUM(SUM(ps_supplycost * ps_availqty))
                    over ( ) as grand
                FROM partsupp, supplier, nation
                WHERE ps_suppkey = s_suppkey
                    and s_nationkey = n_nationkey
                    and n_name = 'GERMANY'
                GROUP BY ps_partkey) V
        WHERE V.value > V.grand * 0.001;
```

Query Q2 produces the same results as that produced by query Q1, namely results 400 in FIG. 4. In Query Q2, a window function, SUM (SUM (ps_supplycost*ps_availqty)) over ( ), is applied to the algebraic aggregate function of SUM (ps_supplycost*ps_availqty). This algebraic aggregate window function allows the total sum (i.e. grand) to be computed in the same query block as the sum for each group (i.e. value), thereby eliminating the need for two almost identical query blocks, like those used in Query Q1. The result is the elimination of one set of duplicative join operations. In addition, both the group sums and the total sum are now computed within one pass of the table partsupp, thereby eliminating multiple accesses to the table partsupp to sum its rows. Therefore, by rewriting query Q1 as query Q2, duplicative join operations and table accesses have been eliminated from the query, significantly increasing the efficiency of processing the query Q1.

Conditions for Rewriting Queries

A query that contains an outer query and a subquery in a HAVING clause, such as query Q1 above, may be rewritten to eliminate a subquery if certain conditions are satisfied. Specifically, the query transformation described above can be performed for an original query if:

(1) the original query contains an outer query that has (i) a GROUP BY clause; and (ii) a HAVING clause that contains a subquery;

(2) the outer query in the original query contains a first set of one or more join operations and the subquery in the original query contains a second set of one or more join operations such that:

(a) the first set of one or more join operations contains all the join operations that are in the second set of one or more join operations;

(b) any join operations that are in the first set of one or more join operations but not in the second set of one or more join operations are lossless;

(3) at least one of the outer query and the subquery computes an algebraic aggregate function (e.g., SUM, COUNT, MAX, MIN, AVG., . . . etc.);

If the above conditions are satisfied, then the original query can be transformed into a new query by performing the following:

(1) eliminate the subquery from the original query;

(2) create an inline view such that the inline view:

(a) contains a set of join operations that is equivalent to the first set of join operations (i.e. the set of join operations in the outer query of the original query);

(b) includes a GROUP BY clause that is equivalent to the GROUP BY clause in the outer query of the original query;

(c) computes an algebraic aggregate window function that computes the algebraic aggregate function in the original query's outer query and/or subquery over a range;

(3) create a predicate in the outer query to reference the inline view.

Further Examples of Query Transformations

Below are several examples that further illustrate various queries that satisfy the conditions listed above and how these queries may be transformed according to the transformation described above.

First, as listed above in the set of conditions for query transformation, the outer query in the original query may contain additional tables and join conditions that are not contained in the subquery as long as the additional join conditions are lossless. A join between two tables T2 and T1 on $T2.f=T1.p$ is considered lossless for T2 if and only if $T2.f$ is a foreign key that refers to the primary key $T1.p$ (i.e., there exists a functional dependency from $T2.f$ to $T1.p$) and $T2.f$ does not contain any null values. The following is an example that illustrates a transformation where the original query contains an outer query that includes a table and join condition that is not included in the subquery. Query Q3 below is an original query.

```
Q3 = SELECT d.key k1
    FROM a, b, c, d
    WHERE a.x = b.x and a.y = c.y and a.z = d.z
    GROUP BY d.key
    HAVING SUM(d.val) >
           (SELECT COUNT(c.val)
            FROM a, b, c
            WHERE a.x = b.x and a.y = c.y);
```

If the join involving table d (i.e. "a.z=d.z") is lossless, then Q3 can be transformed into the following query, Q4.

```
Q4 = SELECT k1
    FROM (SELECT d.key k1,
                 SUM(d.val) v1,
                 SUM(COUNT(c.val)) over ( ) v2
          FROM a, b, c, d
          WHERE a.x = b.x and a.y = c.y and a.z = d.z
          GROUP BY d.key)
    WHERE v1 > v2;
```

Second, although query Q1 in the example discussed above contains an algebraic aggregate function in the outer query, the inclusion of an algebraic aggregate function in the outer query is not a necessary condition for the performance of the transformation. The query Q3 just discussed does not have an algebraic aggregate function in its outer query. Instead, Q3 contains an algebraic aggregate function (i.e. count) in its subquery. As listed in the conditions, only one of the outer query and the subquery in the original query need contain an algebraic aggregate function.

The following query, Q5, is another query that does not contain an algebraic aggregate function in the outer query.

```
Q5 = SELECT ps_partkey
    FROM partsupp, supplier, nation
    WHERE ps_suppkey = s_suppkey
        and s_nationkey = n_nationkey
        and n_name = 'GERMANY'
    GROUP BY ps_partkey
    HAVING ps_partkey >
```

```
        (SELECT SUM(ps_supplycost * ps_availqty) * 0.001
         FROM partsupp, supplier, nation
         WHERE ps_suppkey = s_suppkey
             and s_nationkey = n_nationkey
             and n_name = 'GERMANY');
```

Query Q5 can be transformed into the following query Q6.

```
Q6 = SELECT ps_partkey
    FROM (SELECT ps_partkey,
                 SUM(SUM(ps_supplycost * ps_availqty))
                     over ( ) as grand
          FROM partsupp, supplier, nation
          WHERE ps_suppkey = s_suppkey
              and s_nationkey = n_nationkey
              and n_name = 'GERMANY'
          GROUP BY ps_partkey) V
    WHERE V.ps_partkey > V.grand * 0.001;
```

Finally, the aggregate function in the outer query and the aggregate function in the subquery need not be the same in order for the query transformation to be performed. For example, consider query Q7 below.

```
Q7 = SELECT ps_partkey, SUM(ps_supplycost * ps_availqty) as value
    FROM partsupp, supplier, nation
    WHERE ps_suppkey = s_suppkey
        and s_nationkey = n_nationkey
        and n_name = 'GERMANY'
    GROUP BY ps_partkey
    HAVING SUM(ps_supplycost * ps_availqty) >
           (SELECT MAX(ps_supplycost * ps_availqty) * 0.001
            FROM partsupp, supplier, nation
            WHERE ps_suppkey = s_suppkey
                and s_nationkey = n_nationkey
                and n_name = 'GERMANY');
```

Although Q7 contains a SUM function in the outer query and a MAX function in the subquery, query Q7 may still be rewritten according to the transformation steps listed above. Query Q8, below, is the transformed query for Q7.

```
Q8 = SELECT ps_partkey, value
    FROM (SELECT ps_partkey,
                 SUM(ps_supplycost * ps_availqty) as value,
                 MAX(MAX(ps_supplycost * ps_availqty)) over ( ) as grand
          FROM partsupp, supplier, nation
          WHERE ps_suppkey = s_suppkey
              and s_nationkey = n_nationkey
              and n_name = 'GERMANY'
          GROUP BY ps_partkey) V
    WHERE V.value > V.grand * 0.001;
```

Selection of a Window Function for the Transformed Query

In the transformed query, the algebraic aggregate window function in the inline view must be logically equivalent to the algebraic aggregate function(s) in the original query. For example, in Query Q1, the algebraic aggregation functions in the subquery is a SUM functions, and a SUM function over an entire range is the same as the sum of SUM functions over all the sub-ranges (i.e., partitions) in the entire range; therefore, the algebraic aggregate window function in the transformed Query Q2 is a SUM window function over a SUM aggregate function. In an example where the algebraic aggregate function in the subquery of the original query is a COUNT function, however, a COUNT function over an entire range is not the same as the count of COUNT functions over all the sub-ranges in the entire range. Actually, a COUNT function over an entire range is the same as the sum of count functions over all the sub-ranges in the entire range. Therefore, in the transformed query in this example, the algebraic aggregate window function is a sum window function over a count aggregate function. Therefore, according to one embodiment, to generate the transformed query, the algebraic aggregate function(s) in the original query are examined and a logically equivalent algebraic aggregate window function is used for the transformed query.

For example, consider query Q9 below:

```
Q9 = SELECT ps_partkey, SUM(ps_supplycost * ps_availqty) as value
    FROM partsupp, supplier, nation
    WHERE ps_suppkey = s_suppkey
        and s_nationkey = n_nationkey
        and n_name = 'GERMANY'
    GROUP BY ps_partkey
    HAVING SUM(ps_supplycost * ps_availqty) >
        (SELECT COUNT(ps_supplycost * ps_availqty) * 0.001
        FROM partsupp, supplier, nation
        WHERE ps_suppkey = s_suppkey
            and s_nationkey = n_nationkey
            and n_name = 'GERMANY');
```

Query Q9 contains a COUNT function in the subquery. Therefore, in the transformed query Q10 below, the algebraic aggregate window function is a SUM window function over a COUNT aggregate function.

```
Q8 = SELECT ps_partkey, value
    FROM (SELECT ps_partkey,
        SUM(ps_supplycost * ps_availqty) as value,
        case when SUM(COUNT(ps_supplycost * ps_availqty)) over ( )
            is null then 0 else SUM(COUNT(ps_supplycost * ps_availqty))
            over ( ) as grand
        FROM partsupp, supplier, nation
        WHERE ps_suppkey = s_suppkey
            and s_nationkey = n_nationkey
            and n_name = 'GERMANY'
        GROUP BY ps_partkey) V
    WHERE V.value > V.grand * 0.001;
```

Transformations for Queries that Contain Subqueries that Contain Group by Clauses If an original query contains a subquery that contains a GROUP clause, and if certain further conditions are met, then the original query may also be transformed to eliminate the subquery.

Specifically, the original query, in addition to satisfying the conditions already listed above, must also meet the following conditions:

(1) the original query contains a subquery that in turn contains a GROUP BY clause such that:
   (a) all columns referenced in the GROUP BY clause of the subquery are referenced in the GROUP BY clause of the outer query;

If these additional conditions are met, then the original query can be transformed into a new query by performing the following in addition to the transformation steps described above:

(1) create a second inline view such that the second inline view:
   (a) contains the inline view that was created in a step described above (this inline view will be referred to as the "first inline view");

(2) include, in the algebraic aggregate window function in the first inline view, a partition-by clause that references the one or more column references in the GROUP BY clause in the subquery;

(3) include, in predicate in the outer query in the transformed query that references the first inline view, a reference to the second inline view.

Example Transformations for Queries that Contain Subqueries that Contain Group by Clauses Below are several examples that illustrate various queries that satisfy the conditions listed above with regard to subqueries that contain GROUP BY clauses and how these queries may be transformed according to the transformation described above.

Consider query Q11 below.

```
Q11 = SELECT ps_partkey, s_name, SUM(ps_supplycost *
    ps_availqty) as VALUE
    FROM partsupp, supplier, nation
    WHERE ps_suppkey = s_suppkey
        and s_nationkey = n_nationkey
        and n_name = 'GERMANY'
    GROUP BY s_name, ps_partkey
    HAVING SUM(ps_supplycost * ps_availqty) > ANY
        (SELECT
            SUM(ps_supplycost * ps_availqty) * 0.001
            FROM partsupp, supplier, nation
            WHERE ps_suppkey = s_suppkey
                and s_nationkey = n_nationkey
                and n_name = 'GERMANY'
            GROUP BY ps_partkey);
```

A subquery that contains a GROUP BY clause may result in the subquery producing more than one row. This result must be filtered by an ANY or ALL function so that only one row is being compared in the HAVING clause. In query Q11, for example, the ANY function is applied to the results of the subquery.

When an ANY function is applied to the results of a subquery and where the comparator operator in the HAVING clause is either greater than (">") or lesser than ("<"), a MIN window function is introduced in the transformed query and the result from the MIN window functions is compared in the outer query block predicate of the transformed query. Query Q12 below produces the same results as Q11 and illustrates the transformation just described.

```
Q12 = SELECT ps_partkey, s_name, VALUE
    FROM (
        SELECT ps_partkey, s_name, VALUE,
        MIN(VALUE_partkey) over ( ) MIN_VALUE_partkey
        FROM (
            SELECT ps_partkey, s_name,
            SUM(ps_supplycost * ps_availqty) as VALUE,
            SUM(SUM(ps_supplycost * ps_availqty)) over
                (PARTITION BY ps_partkey) VALUE_partkey
            FROM partsupp, supplier, nation
```

-continued

```
        WHERE ps_suppkey = s_suppkey
            and s_nationkey = n_nationkey
            and n_name = 'GERMANY'
        GROUP BY s_name, ps_partkey
        ) v1
    ) v2
WHERE v1.VALUE > v2.MIN_VALUE_partkey * 0.001;
```

Query Q12 is the result of performing the transformation steps described above. If an ALL function, instead of an ANY function, is applied to the results of a subquery, a MAX window function is introduced in the transformed query and the transformation is performed in way that is otherwise similar to the transformation from query Q11 to query Q13.

Query Q13 below is an original query where an ALL function is applied to the results of the subquery and where the comparator operator in the HAVING clause is an equality operator ("="). In such a case, both the MAX and MIN window functions are introduced and the results from these window functions are compared in the outer query block predicate of the transformed query, as will be illustrated in query Q14 further below.

First, consider Query Q13:

```
Q13 = SELECT ps_partkey, s_name, SUM(ps_supplycost *
        ps_availqty) as VALUE
    FROM partsupp, supplier, nation
    WHERE ps_suppkey = s_suppkey
        and s_nationkey = n_nationkey
        and n_name = 'GERMANY'
    GROUP BY s_name, ps_partkey
    HAVING SUM(ps_supplycost * ps_availqty) = ALL
        (SELECT
            SUM(ps_supplycost * ps_availqty) * 0.001
            FROM partsupp, supplier, nation
            WHERE ps_suppkey = s_suppkey
                and s_nationkey = n_nationkey
                and n_name = 'GERMANY'
            GROUP BY ps_partkey);
```

Query Q13 can be transformed into the following query Q14.

```
Q14 = SELECT ps_partkey, s_name, VALUE
    FROM (
        SELECT ps_partkey, s_name, VALUE,
        MIN(VALUE_partkey) over ( ) MIN_VALUE_partkey,
        MAX(VALUE_partkey) over ( ) MAX_VALUE_partkey,
        FROM (
            SELECT ps_partkey, s_name,
                SUM(ps_supplycost * ps_availqty) as VALUE,
                SUM(SUM(ps_supplycost * ps_availqty)) over
                    (PARTITION BY ps_partkey) VALUE_partkey
            FROM partsupp, supplier, nation
            WHERE ps_suppkey = s_suppkey
                and s_nationkey = n_nationkey
                and n_name = 'GERMANY'
            GROUP BY s_name, ps_partkey
        ) v1
    ) v2
WHERE v1.VALUE > v2.MIN_VALUE_partkey * 0.001 and
        v2.MIN_VALUE_partkey = v2.MAX_VALUE_partkey;
```

Query Q15 below is an original query where an ANY function is applied to the results of the subquery and where the comparator operator in the HAVING clause is an equality operator ("="). In such a case, a COUNT window function is introduced. This COUNT window function is of the form: COUNT (case when <equality predicate> then 1 else NULL end) OVER (order by <left-hand source of original predicate> range between current row and current row as matched. Furthermore, the predicate in the outermost query block of the transformed query block will be: matched >0. Query Q16, further below, illustrates how the COUNT window function is applied and used.

First, consider Query Q15:

```
Q15 = SELECT ps_partkey, s_name, SUM(ps_supplycost *
        ps_availqty) as VALUE
    FROM partsupp, supplier, nation
    WHERE ps_suppkey = s_suppkey
        and s_nationkey = n_nationkey
        and n_name = 'GERMANY'
    GROUP BY s_name, ps_partkey
    HAVING SUM(ps_supplycost * ps_availqty) = ANY
        (SELECT
            SUM(ps_supplycost * ps_availqty) * 0.001
            FROM partsupp, supplier, nation
            WHERE ps_suppkey = s_suppkey
                and s_nationkey = n_nationkey
                and n_name = 'GERMANY'
            GROUP BY ps_partkey);
```

Query Q15 can be transformed into the following query Q16.

```
Q16 = SELECT ps_partkey, s_name, VALUE
    FROM (
        SELECT ps_partkey, s_name, VALUE,
        COUNT(case when VALUE = VALUE_partkey * 0.0001
            then 1 else NULL end) OVER (order by VALUE
            RANGE between CURRENT ROW and CURRENT ROW)
            as matched
        FROM (
            SELECT ps_partkey, s_name,
                SUM(ps_supplycost * ps_availqty) as VALUE,
                SUM(SUM(ps_supplycost * ps_availqty)) over
                    (PARTITION BY ps_partkey) VALUE_partkey
            FROM partsupp, supplier, nation
            WHERE ps_suppkey = s_suppkey
                and s_nationkey = n_nationkey
                and n_name = 'GERMANY'
            GROUP BY s_name, ps_partkey
        ) v1
    ) v2
WHERE v2.matched > 0;
```

Hardware Overview

Figure 5:
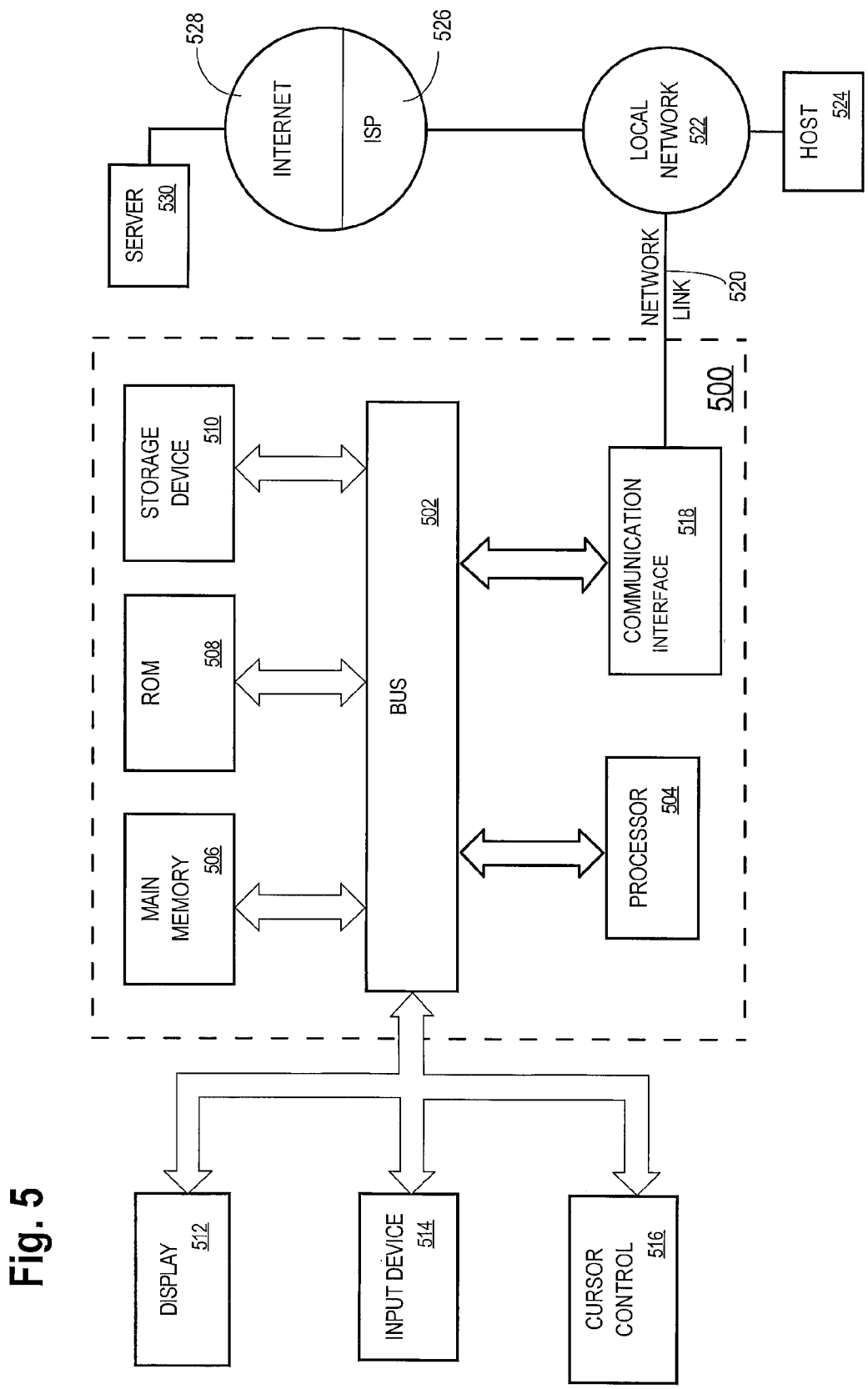
FIG. 5 depicts a computer system which may be used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for transforming a query, comprising the steps of:
   generating a transformed query for the query, wherein:
   the query includes an outer query that has (1) a GROUP BY clause and (2) a HAVING clause that contains a subquery;
   the outer query includes a first set of one or more join operations;

the subquery includes a second set of the one or more join operations;

any join operation that is in the second set of one or more join operations is included in the first set of one or more join operations;

any join operation that is in the first set of one or more join operations and not in the second set of one or more join operations is lossless; and at least one of the outer query and the subquery computes an algebraic aggregate function; and wherein generating the transformed query comprises the steps of:

eliminating the subquery;

creating an inline view, wherein the inline view:

includes a set of join operations that is equivalent to the first set of join operations;

includes a GROUP BY clause that is equivalent to the GROUP BY clause in the outer query;

computes an algebraic aggregate window function that computes an algebraic aggregate function over a range;

creating a predicate in the outer query that references the inline view; and wherein the steps of the method are performed by one or more computing devices.

2. The method of claim 1, wherein both the outer query and the subquery computes an algebraic aggregate function.

3. The method of claim 1, wherein:

the GROUP BY clause in the outer query is a first GROUP BY clause that references one or more columns;

the subquery includes a second GROUP BY clause that references one or more columns;

the one or more columns referenced in the first GROUP BY clause includes the one or more columns referenced in the second GROUP BY clause; and generating the transformed query further comprises the steps of:

creating a second inline view;

wherein:

the inline view is a first inline view;

the first inline view is nested within the second inline view;

the algebraic aggregate window function includes a partition-by clause that references the one or more columns references in the second GROUP BY clause; and the predicate in the outer query that references the first inline view also references the second inline view.

4. The method of claim 3, wherein:

the HAVING clause specifies that an ANY function be applied to the subquery;

the second inline view includes a MIN function that references the algebraic aggregate window function; and the predicate in the outer query references an output of the MIN function.

5. The method of claim 4, wherein:

the HAVING clause specifies that an expression be greater than the ANY function; and the predicate in the outer query specifies that the expression be greater than a value that is based on the output of the MIN function.

6. The method of claim 4, wherein:

the HAVING clause specifies that an expression be less than the ANY function; and the predicate in the outer query specifies that the expression be less than a value that is based on the output of the MIN function.

7. The method of claim 3, wherein:

the HAVING clause specifies that an ALL function be applied to the subquery;

the second inline view includes a MAX function that references the algebraic aggregate window function; and the predicate in the outer query references an output of the MAX function.

8. The method of claim 7, wherein:

the HAVING clause specifies that an expression be greater than the ALL function; and the predicate in the outer query specifies that the expression be greater than a value that is based on the output of the MIN function.

9. The method of claim 7, wherein:

the HAVING clause specifies that an expression be less than the ALL function; and the predicate in the outer query specifies that the expression be less than a value that is based on the output of the MAX function.

10. The method of claim 7, wherein:

the HAVING clause specifies that an expression be equal to the ALL function;

the second inline view includes a MIN function that references the algebraic aggregate window function; and the predicate in the outer query specifies that the expression be equal to a value that is based on the output of the MAX function and equal to a value that is based on the output of the MIN function.

11. The method of claim 3, wherein:

the HAVING clause specifies that an ANY function be applied to the subquery;

the HAVING clause specifies that an expression be equal to the ANY function;

the second inline view includes a COUNT function, wherein the COUNT function counts how many rows in a set of results for the subquery are equal to the expression; and the predicate in the outer query references the output of the COUNT function.

12. A non-transitory computer-readable storage medium storing instructions, the instructions including instructions which, when executed by one or more processors, cause the one or more processors to perform the steps of:

generating a transformed query for the query, wherein:

the query includes an outer query that has (1) a GROUP BY clause and (2) a HAVING clause that contains a subquery;

the outer query includes a first set of one or more join operations;

the subquery includes a second set of one or more join operations;

any join operation that is in the second set of one or more join operations is included in the first set of one or more join operations;

any join operation that is in the first set of one or more join operations and not in the second set of one or more join operations is lossless; and at least one of the outer query and the subquery computes an algebraic aggregate function;

wherein generating the transformed query comprises the steps of:

eliminating the subquery; and creating an inline view, wherein the inline view:

includes a set of join operations that is equivalent to the first set of join operations;

includes a GROUP BY clause that is equivalent to the GROUP BY clause in the outer query;

computes an algebraic aggregate window function that computes an algebraic aggregate function over a range; and creating a predicate in the outer query that references the inline view.

13. The non-transitory computer-readable storage medium of claim 12, wherein both the outer query and the subquery computes an algebraic aggregate function.

14. The non-transitory computer-readable storage medium of claim 12, wherein:
the GROUP BY clause in the outer query is a first GROUP BY clause that references one or more columns;
the subquery includes a second GROUP BY clause that references one or more columns;
the one or more columns referenced in the first GROUP BY clause includes the one or more columns referenced in the second GROUP BY clause; and
instructions for generating the transformed query further comprises instructions for:
creating a second inline view;
wherein:
the inline view is a first inline view;
the first inline view is nested within the second inline view;
the algebraic aggregate window function includes a partition-by clause that references the one or more columns references in the second GROUP BY clause; and
the predicate in the outer query that references the first inline view also references the second inline view.

15. The non-transitory computer-readable storage medium of claim 14, wherein:
the HAVING clause specifies that an ANY function be applied to the subquery; the
second inline view includes a MIN function that references the algebraic aggregate window function; and
the predicate in the outer query references an output of the MIN function.

16. The non-transitory computer-readable storage medium of claim 15, wherein:
the HAVING clause specifies that an expression be greater than the ANY function; and
the predicate in the outer query specifies that the expression be greater than a value that is based on the output of the MIN function.

17. The non-transitory computer-readable storage medium of claim 15, wherein:
the HAVING clause specifies that an expression be less than the ANY function; and
the predicate in the outer query specifies that the expression be less than a value that is based on the output of the MIN function.

18. The non-transitory computer-readable storage medium of claim 14, wherein:
the HAVING clause specifies that an ALL function be applied to the subquery;
the second inline view includes a MAX function that references the algebraic aggregate window function; and
the predicate in the outer query references an output of the MAX function.

19. The non-transitory computer-readable storage medium of claim 18, wherein:
the HAVING clause specifies that an expression be greater than the ALL function; and
the predicate in the outer query specifies that the expression be greater than a value that is based on the output of the MIN function.

20. The non-transitory computer-readable storage medium of claim 18, wherein:
the HAVING clause specifies that an expression be less than the ALL function; and
the predicate in the outer query specifies that the expression be less than a value that is based on the output of the MAX function.

21. The non-transitory computer-readable storage medium of claim 18, wherein:
the HAVING clause specifies that an expression be equal to the ALL function;
the second inline view includes a MIN function that references the algebraic aggregate window function; and
the predicate in the outer query specifies that the expression be equal to a value that is based on the output of the MAX function and equal to a value that is based on the output of the MIN function.

22. The non-transitory computer-readable storage medium of claim 14, wherein:
the HAVING clause specifies that an ANY function be applied to the subquery;
the HAVING clause specifies that an expression be equal to the ANY function;
the second inline view includes a COUNT function,
wherein the COUNT function counts how many rows in a set of results for the subquery are equal to the expression; and
the predicate in the outer query references the output of the COUNT function.

* * * * *

UNITED STATES PATENT AND TRADEMARK OFFICE
CERTIFICATE OF CORRECTION

| | | |
|---|---|---|
| PATENT NO. | : 7,945,560 B2 | |
| APPLICATION NO. | : 12/125783 | |
| DATED | : May 17, 2011 | |
| INVENTOR(S) | : Rafi Ahmed and Srikanth Bellamkonda | |

It is certified that error appears in the above-identified patent and that said Letters Patent is hereby corrected as shown below:

First page, item (54) replace

"TECHNIQUE FOR REMOVING SUBQUERY IN GROUP BY-HAVING CLAUSES USING WINDOW FUNCTIONS"; with

--TECHNIQUE FOR REMOVING SUBQUERY USING WINDOW FUNCTIONS--

Column 1, line 1 replace:

"TECHNIQUE FOR REMOVING SUBQUERY IN GROUP BY-HAVING CLAUSES USING WINDOW FUNCTIONS"; with

--TECHNIQUE FOR REMOVING SUBQUERY USING WINDOW FUNCTIONS--

Signed and Sealed this
Fifth Day of July, 2011

David J. Kappos
*Director of the United States Patent and Trademark Office*

UNITED STATES PATENT AND TRADEMARK OFFICE
CERTIFICATE OF CORRECTION

PATENT NO. : 7,945,560 B2
APPLICATION NO. : 12/125783
DATED : May 17, 2011
INVENTOR(S) : Ahmed et al.

Page 1 of 1

It is certified that error appears in the above-identified patent and that said Letters Patent is hereby corrected as shown below:

In column 15, line 31-38, delete
"15. The non-transitory computer-readable storage medium of claim 14, wherein: the HAVING clause specifies that an ANY function be applied to the subquery; the second inline view includes a MIN function that references the algebraic aggregate window function; and
the predicate in the outer query references an output of the MIN function." and
insert -- 15. The non-transitory computer-readable storage medium of claim 14, wherein:
the HAVING clause specifies that an ANY function be applied to the subquery;
the second inline view includes a MIN function that references the algebraic aggregate window function; and
the predicate in the outer query references an output of the MIN function. --, therefor.

Signed and Sealed this
Twenty-seventh Day of March, 2012

David J. Kappos
*Director of the United States Patent and Trademark Office*